G. T. HANCHETT.
CLUTCH.
APPLICATION FILED JULY 24, 1914. RENEWED JULY 22, 1915.
1,172,525.  Patented Feb. 22, 1916.
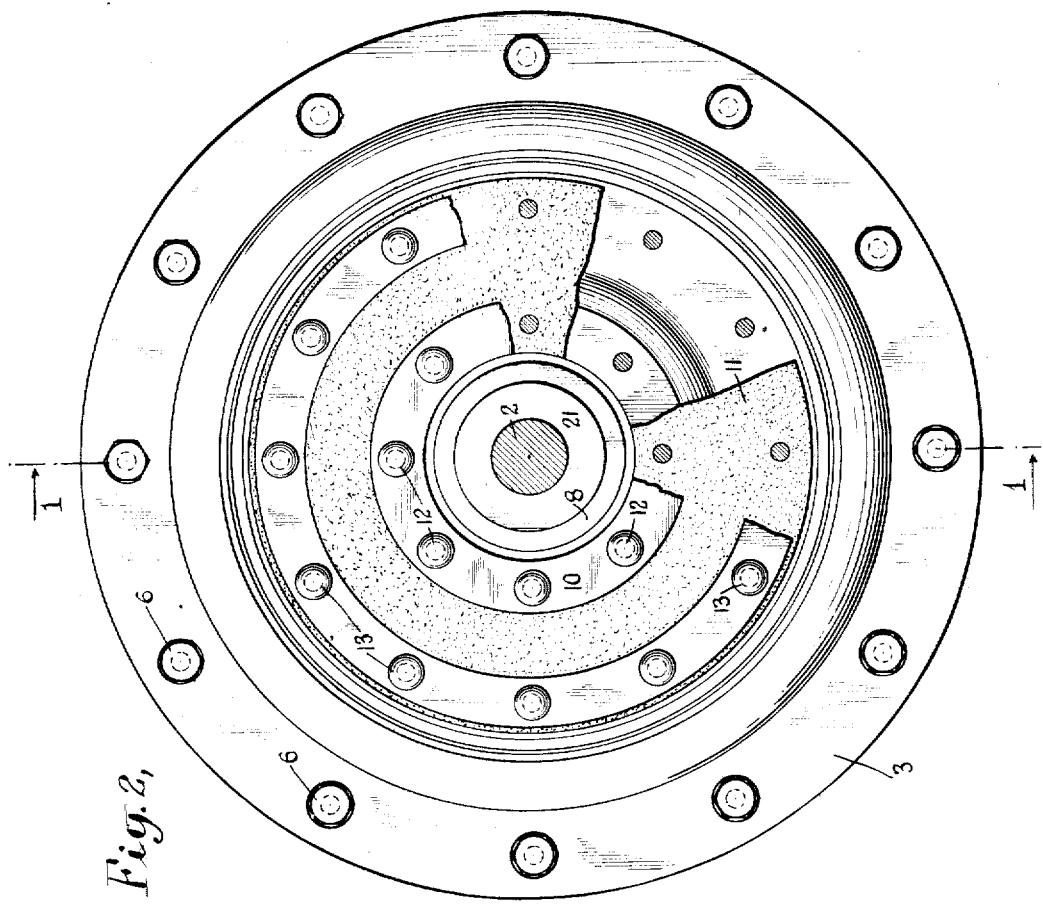
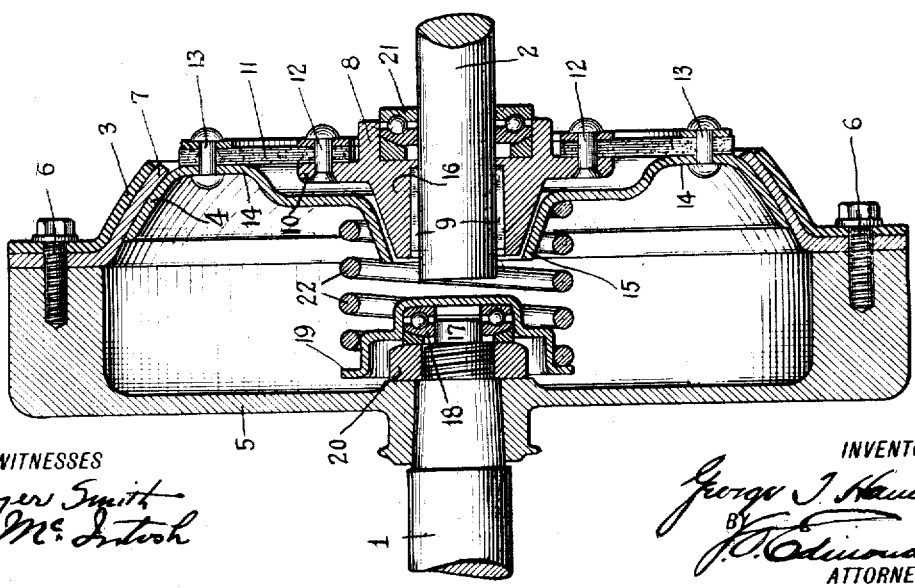

UNITED STATES PATENT OFFICE.

GEORGE T. HANCHETT, OF NEW YORK, N. Y.

CLUTCH.

1,172,525.  Specification of Letters Patent.  Patented Feb. 22, 1916.

Application filed July 24, 1914, Serial No. 852,831. Renewed July 22, 1915. Serial No. 41,394.

*To all whom it may concern:*

Be it known that I, GEORGE T. HANCHETT, a citizen of the United States, residing in the borough of Manhattan, city, county, and State of New York have invented certain new and useful Improvements in Clutches, of which the following is a specification.

My invention relates to friction clutches, and particularly to such clutches as are employed for connecting and disconnecting the engine shaft of an automobile to the shaft driven thereby.

The object of my invention is to provide a simple, compact and efficient clutch of novel design, and one which is reliable in operation and comparatively inexpensive to manufacture.

By my invention, one clutch member is carried by the driving shaft and the other is in effect combined with a universal joint, the connected parts being connected to rotate with the end of the driven shaft, and so mounted that the end of the driven shaft may vibrate or move out of alinement with the driving shaft without affecting the substantial alinement of the coöperating clutch surfaces. Means are provided for compensating for lack of alinement between the driving and driven shafts, both when the clutch members are in engagement and when they are out of engagement.

It is necessary, in a clutch in an automobile in which the engine and the transmission are separately mounted upon the chassis, to allow for the "weave" of the chassis as the vehicle operates over the road; and this necessity exists when the clutch is out of engagement as well as when it is in. This is because the coacting clutch surfaces, when out of engagement, must be held in substantial alinement, so that they will properly and concentrically engage when brought together. In the usual practice, the engine or driving shaft is provided with an extension, on which the driven clutch member slides, this clutch member being connected with the transmission through some sort of a universal joint. In this usual construction the universal joint or flexible member corrects or compensates for lack of alinement between the shafts, both when the clutch is in, and when it is out of engagement, as is necessary, since when the clutch is "in" it is rigidly connected to the driving member, and when it is "out" it is in substantial concentric alinement with the driving member, and in both cases requires a flexible connection with the driven member. In the present invention the same compensating action is provided for, but in a different and novel manner. The driven member of the clutch is mounted, not on the driving shaft or an extension thereof, but surrounding the end of the driven shaft, and is flexibly connected to the latter, when the clutch members are in engagement, by the flexible means or universal joint referred to. This latter then acts to permit movements of the driven shaft out of alinement with the driving shaft. When the clutch members are out of engagement, a second flexible means, at that time connecting the driving and driven shafts, comes into play, to maintain the driven position of the clutch in substantial concentric relation with the driving portion thereof, and ready to engage with the driving portion, while at the same time it permits slight changes of alinement of the shafts due to the weaving of the frame, while the clutch is out of engagement. In the construction which I will illustrate and particularly describe hereafter, this second flexible means comprises a spring mounted in the interior of the clutch, so as to have the double function of holding the clutch members together, when they are in engagement, and to form a transversely yielding connection between the shafts and clutch members when the latter are out of engagement. By the means described, among other advantages, I do away with the extension to the driving shaft, referred to as used in the common construction, which extension is expensive and somewhat difficult to properly support.

In my preferred structure, one clutch member is mounted on the rim of a hollow fly-wheel, secured to the driving shaft, the adjacent ends of the two shafts are within the interior of the fly-wheel, and the spring for holding the clutch member normally in engagement, and acting as a yielding connection when they are out of engagement, is mounted axially with the shafts within the fly-wheel, resulting in great economy of space, and an exceedingly compact structure. In greater detail, in my preferred structure, the clutch member secured to the driving shaft is frictionally engaged by a clutch member which is connected with a leather or other suitable flexible annulus connected to a member which is splined to the end of the driven shaft, the frictional engagement between the clutch members normally being maintained by the spring means referred to interposed between the end of the driving shaft and the clutch member which surrounds and is flexibly connected to the driven shaft. The thimble which is slidably mounted on the end of the driven shaft is surrounded by a portion of the clutch member which is flexibly connected thereto, but is spaced apart therefrom so that the end of the driven shaft may take various positions when the machine is in operation, the leather or other flexible supporting means for the clutch member permitting such movements of the end of the driven shaft as the latter is subject to in operation. When the two shafts are to be disconnected, the sliding thimble on the end of the driven shaft is moved axially against the pressure of the spring referred to, the clutch member which is flexibly connected to the sliding thimble being contacted by the thimble to positively move the clutch member out of its engaging position. When the clutch surface of the driven clutch member has moved out of engagement with the coacting surface of the driving clutch member, the spring referred to yieldingly supports the end of the driven shaft, and the driven clutch member, and provides for the substantial alinement of the latter with the driving clutch member, while the clutch members are out of engagement.

In order that my invention may be more clearly understood, attention is hereby directed to the accompanying drawings, forming part of this specification and illustrating a preferred embodiment thereof.

In the drawings, Figure 1 represents a vertical cross-section through my improved clutch, taken on line 1—1 of Fig. 2, and Fig. 2 is an end view thereof.

Referring to the drawings, the engine or driving shaft 1 is coupled to the driven shaft 2, by means of the coacting clutch members 3 and 4, the former of which is fixedly secured to the driving shaft. In my preferred construction, clutch member 3 is secured to the rim of the hollow fly-wheel 5, which is fast on the driving shaft, by any suitable means such as the bolts 6. Clutch member 3 is provided with clutch lining 7 of any suitable material. A member 8 is slidably mounted on the end of driven shaft 2, preferably by means of a plurality of keys 9 mounted in key ways formed on the shaft. The member 8 is provided with an annular flange 10 extending at right angles to the axis of shaft 2, and what I term a clutch universal 11 is secured to this flange. This element comprises a connection with the clutch member 4 which is yieldable in the direction of the axis of shaft 2, but is rigid in a direction at right angles to the shaft to transmit power to the driven shaft when the clutch is in engagement. Preferably, member 11 comprises a leather annulus formed by securing together a number of leather rings laid face to face to make the same sufficiently stiff. Member 11 is suitably secured to flange 10, as by rivets 12, and adjacent its outer edge is secured, as by rivets 13, to an annular portion 14 of clutch member 4, which annular portion extends about and parallel to flange 10. Clutch member 4 is also formed with an inwardly extending conical portion 15, surrounding the hub portion 16 of member 8 which hub portion is similarly provided with a conical surface.

Crank shaft 1 is preferably provided, at its end 17 of reduced diameter, with a thrust ball bearing 18. A cap member 19 is mounted upon the end of bearing 18, a nut 20 being threaded upon the shaft between the thrust bearing and the hub of the fly-wheel. Sliding member 8 is provided with a suitable thrust bearing, preferably a thrust ball bearing 21 as shown. A stiff spiral spring 22 is interposed between cap 19 and the vertical portion of clutch member 4 adjacent to the hub 16 of sliding member 8.

Normally in operation, the driving shaft and driven shaft are coupled together by the frictional engagement of the conical engaging surfaces of clutch members 3 and 4, the latter of which is held in engaging position by spring 22. When the clutch is to be disengaged, member 8 is moved axially toward the end of shaft 2 by any suitable clutch operating device, the exterior surface of hub 16 engaging the surrounding portion 15 of clutch member 4 to positively move clutch 4 out of engaging position. When an automobile on which the clutch is used is in operation, the end of the driven shaft 2 to which the clutch is applied is not maintained in absolute alinement with the driving shaft, as has been stated, but tends to constantly flex and vary in position under the running conditions. Such movements are provided for, while the clutch members are in engagement, by the flexible member 11, which will bend sufficiently to permit such movements of shaft 2 while at all times transmitting power from clutch member 4 to sliding member 8 and thence to shaft 2. When the clutch members are out of engagement, hub or thimble 16 being in engagement with the surrounding portion 15 of the driven clutch member, spring 22, surrounding and engaging the portion 15 of clutch member 4, at one end, and the cap 19 at the other end, yieldingly supports the clutch member 4 and the end of driven shaft 2, and keeps the clutch member 4 substantially in concentric alinement with clutch member 3, while permitting whatever flexure the end of shaft 2 may be subject to under these conditions. The spring 22 thus performs, in this construction, the double duty referred to of acting longitudinally to normally hold the clutch members in engagement, and of acting as a transversely yieldable member in the connection between the shafts when the clutch members are out of engagement. It should also be noted that the hub or thimble 16, on the driven shaft, constitutes a means, when the clutch members are out of engagement, for engaging and centralizing the driven clutch member with the driven shaft.

It should be noted that the engaging surfaces of clutch members 3 and 4 are preferably formed with concentric curves, taken about a center lying in the axis of shaft 1, so that flexing movement of the driven shaft 2, during the operation of the car, may result, if hub 16 should contact surrounding part 15 of the clutch 4, in a slight sliding movement of clutch 4 on the coacting clutch surface, without affecting the closeness of contact of the clutch surfaces. It should also be noted that the driving shaft 1 is provided with thrust ball bearing 18, as stated, with cap 19 mounted on the end rotatable member thereof. Spring 22 bears on cap 19 and on clutch member 4, as stated, and revolves with the clutch member when the latter is coupled to clutch member 3, cap 19 also rotating therewith. When the clutch members are uncoupled, member 4 does not rotate, but shaft 1 does, if the engine is in operation. Accordingly, if spring 22 bore directly on the end of shaft 1, or a member rotating therewith, there would be considerable friction between the spring and the parts against which it is pressed, when the engine is running and the clutch members disconnected, with consequent wear and tendency to turn the driven shaft through the spring. This difficulty is overcome by the provision of thrust ball bearing 18, which not only takes the thrust of the spring, but permits relative rotation between shaft 1 and cap 19, so that the latter and spring 22 may be at rest when the clutch is uncoupled.

It should be understood that my invention is not strictly limited to the exact details of construction illustrated and particularly described, but is as broad as is indicated by the appended claims.

Having now described my invention, what I claim as new therein and desire to secure by Letters Patent is as follows:—

1. In a clutch, the combination of a driving and a driven shaft, a clutch member mounted to rotate with said driving shaft, a second clutch member, yielding means for rotatably connecting said second clutch member to said driven shaft, spring means mounted in the interior of the clutch for normally holding said clutch members in engagement, and flexibly holding the same substantially in alinement when out of engagement, substantially as set forth.

2. In a clutch, the combination of a driving and a driven shaft, a clutch member mounted to rotate with said driving shaft, a second clutch member, yielding means for rotatably connecting said second clutch member to said driven shaft, spring means mounted in the interior of the clutch for normally holding said clutch members in engagement, and flexibly holding the same substantially in alinement when out of engagement, and means on the driven shaft adapted to engage the driven clutch member and centralize the same with said driven shaft when said clutch members are out of engagement, substantially as set forth.

3. In a clutch, the combination of a driving and a driven shaft, a clutch member rotatable with said driving shaft, a clutch member rotatable with said driven shaft, connections between said second clutch member and driven shaft adapted to permit lateral movement of the latter when said clutch members are in engagement, and means for flexibly maintaining substantial alinement between said shafts when said clutch members are out of engagement, substantially as set forth.

4. In a clutch, the combination of a driving and a driven shaft, a clutch member rotatable with said driving shaft, a clutch member rotatable with said driven shaft, and means for flexibly maintaining substantial alinement between said clutch members when the latter are out of engagement, substantially as set forth.

5. In a clutch, the combination of a driving and a driven shaft, a clutch member rotatable with said driving shaft, a clutch member rotatable with said driven shaft, and a spring so positioned as to normally tend to hold said clutch members in engagement, and to tend to hold said clutch members in substantial concentric alinement when they are out of engagement, substantially as set forth.

6. In a clutch, the combination of a pair of shafts in substantial alinement, a clutch member secured to the end of one shaft and surrounding the end of the other, a member slidably mounted on the end of the second shaft to revolve therewith, a second clutch member, yielding means for connecting said second clutch member and said slidable member, and a coiled spring surrounding the adjacent ends of said shafts and normally pressing said second clutch member into frictional engagement with said first clutch member, substantially as set forth.

7. In a clutch, the combination of a driving and a driven shaft, a clutch member secured to said driving shaft, a member splined on said driven shaft, a clutch member positioned about said slidable member, flexible means securing said second clutch member to said slidable member, and spring means normally holding said clutch members in frictional engagement, substantially as set forth.

8. In a clutch, the combination of a driving and a driven shaft, a fly-wheel secured to said driving shaft, a clutch member secured to said fly-wheel, a thimble splined on said driven shaft to slide lengthwise thereof, a clutch member flexibly secured to said thimble, and spring means tending to hold said clutch members in frictional engagement, substantially as set forth.

9. In a clutch, the combination of a shaft, a member splined upon the end of said shaft and having a conical hub portion and an annular flange, a clutch member having a conical tubular portion surrounding said hub-portion, an annular portion parallel to said flange and a clutch portion, a leather annulus secured to said flange and to said parallel portion of the clutch member, the conical tubular portion of said member being normally out of contact with said conical hub portion, a second shaft in substantial alinement with said first shaft, a clutch member secured to the end thereof and having a clutch face normally in frictional engagement with the clutch portion of said first clutch member, and a spring bearing against said first clutch member to normally hold said clutch members in engagement, substantially as set forth.

10. In a clutch, the combination of a driving shaft and a clutch member secured thereto, a driven shaft, a second clutch member adapted to coact with the first, means rotatably connecting said second clutch member to said driven shaft, said means comprising a member splined to said shaft, normally out of contact with said second clutch member but slidably movable into contact therewith in disengaging the clutch members, and a transmission member between said slidable member and said second clutch member, said transmission member being stiff but universally yieldable, and spring means normally pressing said second clutch member into engagement with the first, substantially as set forth.

11. In a clutch, the combination of a pair of shafts, clutch members rotatable with said shafts respectively and having coacting clutch surfaces curved about the same center, located axially of one of said shafts, and a universal joint combined with one of said clutch members and rotatably connected to one of said shafts, substantially as set forth.

This specification signed and witnessed this 15 day of June, 1914.

GEORGE T. HANCHETT.

Witnesses:
C. M. DERING,
HUGO ACHERZER.

It is hereby certified that in Letters Patent No. 1,172,525, granted February 22, 1916, upon the application of George T. Hanchett, of New York, N. Y., for an improvement in "Clutches," errors appear in the printed specification requiring correction as follows: Page 1, line 74, for the word "position" read *portion;* same page, line 101, for the word "member" read *members;* and that the said Letters Patent should be read with these corrections therein that the same may conform to the record of the case in the Patent Office.

Signed and sealed this 14th day of March, A. D., 1916.

[SEAL.]

J. T. NEWTON,

*Acting Commissioner of Patents.*

Cl. 192—8.